United States Patent
Tanaka

(10) Patent No.: US 6,381,217 B1
(45) Date of Patent: Apr. 30, 2002

(54) DELIVERING METHOD IN ATM POINT-TO-MULTIPOINT CONNECTION

(75) Inventor: Shoji Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/201,895

(22) Filed: Nov. 30, 1998

(30) Foreign Application Priority Data

Nov. 28, 1997 (JP) .............................. 9-329064

(51) Int. Cl.[7] .............................. H04L 12/56; H04Q 1/20
(52) U.S. Cl. .............................. 370/241.1; 370/248
(58) Field of Search .............................. 370/241, 241.1, 370/242, 252, 310.1, 313, 310.2, 328, 248

(56) References Cited

U.S. PATENT DOCUMENTS 5,553,057 A * 9/1996 Nakayama .................. 370/13
5,748,620 A * 5/1998 Capurka .................. 370/328
5,896,496 A * 4/1999 Suzuki .................. 395/185.01

* cited by examiner

*Primary Examiner*—Chau Nguyen
*Assistant Examiner*—Duc Duong
(74) *Attorney, Agent, or Firm*—Sughrue Mion, PLLC

(57) ABSTRACT

A method for checking an ATM point-to-multipoint connection between a paging sender and a plurality of paging receivers in a mobile communications system is disclosed. The paging sender transmits a check cell to the paging receivers through the point-to-multipoint connection at regular intervals. Each of the paging receivers determines whether the check cell is received within a second predetermined time period longer than the first predetermined time period. When the check cell has not been received for the second predetermined time period, a connection resetting request is transmitted to the paging sender to reset the point-to-multipoint connection.

11 Claims, 10 Drawing Sheets

OPERATION OF PAGING TRANSMITTER

OPERATION OF PAGING TRANSMITTER

OPERATION OF BASE STATION

DELIVERING METHOD IN ATM POINT-TO-MULTIPOINT CONNECTION

BACKGROUND OF THE INVENTION

1. Field of the Invention

The present invention generally relates to a mobile communications system providing mobile communication services or personal communication services by delivering a paging signal through an ATM (asynchronous transfer mode) transmission system, and in particular to a method for checking an ATM point-to-multipoint connection of the ATM transmission system.

2. Description of the Related Art

In a mobile communications system having a service area consisting of a plurality of radio zones, a selective calling signal or a paging signal is transmitted to determine whether a destination mobile terminal is located within the service area. As the number of subscribers increases, a very large number of paging signals are transmitted in the mobile communications system, resulting in reduced performance capacity of mobile switches and base stations. In the field of CDMA (code-division multiple access) mobile communications systems using ATM transmission system, multicast techniques of paging signals have been developed by making use of ATM point-to-multipoint function; copy-trunk method and multicast-connection method.

According to the copy-trunk method, as shown in FIG. 1, a point-to-point connection has been set up between ATM transmission system 11 and each of N base stations $B_1$–$B_N$, where N is an integer. When an incoming call occurs, a paging signal transmitter 12 of mobile switch equipment 10 transmits a paging signal to a copy trunk section 13 of the ATM transmission system 11. The copy trunk section 13 converts the paging signal to an ATM paging cell $CELL_{PG}$ and makes N copies of the ATM paging cell CELLS corresponding to the base stations $B_1$–$B_N$, respectively. The respective ATM paging cell $CELL_{PG}$ are sent to the base stations $B_1$–$B_N$ through the setup point-to-point connections.

Since the point-to-point connections have been set up, an OAM (operation, administration and maintenance) cell can be used to test the ATM lines for continuity. More specifically, the test for ATM lines can be carried out by sending an OAM cell through each of the ATM point-to-point connections and then checking whether each OAM cell is sent back by the corresponding base up station.

On the other hand, according to the multicast-connection method, as shown in FIG. 2, the ATM transmission system 11 has had a point-to-multipoint connection set up between a paging transmitter 14 of the mobile switch equipment 10 and the base stations $B_1$–$B_N$. When an incoming call occurs, the paging transmitter 14 converts the paging signal to an ATM paging cell $CELL_{PG}$ and transmits it to the base stations $B_1$–$B_N$ through the point-to-multipoint connection set up in the ATM transmission system 11.

The above copy-trunk method and multicast-connection method, however, have disadvantages as described hereinafter. In the copy-trunk method, it is necessary to set up an ATM point-to-point connection for each subscriber paging line, resulting in increased amount and complexity of equipment. In the case of a communications system having relatively small radio zones such as micro-cells or pico-cells, setting up ATM connections become complicated because a large number of base stations have to be arranged to meet various calling needs. Further, the point-to-point connection provides not only a connection from the paging signal transmitter 12 to the base stations but also the opposite connection. Since the paging operation can be performed using only the former, the equipment for the latter becomes redundant.

In the multicast-connection method, the one-to-multipoint connection is set up in the ATM transmission system 11 to deliver the ATM paging cells to the base stations. However, the opposite multipoint-to-point connection cannot be set up. Therefore, it is impossible to test the ATM lines for continuity using an OAM cell.

SUMMARY OF THE INVENTION

An object of the present invention is to provide a check method which can check AM point-to-multipoint connection between a paging transmitting side and a plurality of paging receiving side with reliability.

Another object of the present invention is to provide a check method which can check ATM point-to-multipoint connection between a paging transmitter and a plurality of base stations of a mobile communications system with reduced amount and complexity of hardware.

The present invention is a method for checking a point-to-multipoint connection set up in an ATM transmission system between a paging sender and a plurality of paging receivers in a mobile communications system.

According to a first aspect of the present invention, the paging sender sets up the point-to-multipoint connection in the ATM transmission system and transmits a check cell to the paging receivers through the point-to-multipoint connection at intervals of a first predetermined time period. Each of the paging receivers determines whether the check cell is received within a second predetermined time period longer than the first predetermined time period. When the check cell has not been received for the second predetermined time period, a connection resetting request Is transmitted to the paging sender to reset the point-to-multipoint connection.

According to a second aspect of the present invention, the paging sender sets up the point-to-multipoint connection in the ATM transmission system and transmits a paging cell to the paging receivers through the point-to-multipoint connection when an incoming call occurs. Each of the paging receivers determines whether a paging cell is received within a first predetermined time period and transmits a check request to the paging sender when a paging cell has not been received for the first predetermined time period. The paging sender transmits a check cell to the paging receivers through the point-to-multipoint connection in response to the check request received from at least one of the paging receivers. The paging receiver determines whether the check cell is received within a second predetermined time period after the check request has been transmitted, and then transmits a connection resetting request to the paging sender to reset the point-to-multipoint connection when the check cell has not been received for the second predetermined time period.

According to a third aspect of the present invention, the paging sender sets up the point-to-multipoint connection in the ATM transmission system and transmits a paging cell to the paging receivers through the point-to-multipoint connection when an incoming call occurs. Each of the paging receivers transmits a paging response to the paging sender when a paging cell is received. The paging sender determines whether there is a paging receiver from which the paging response has not been received for a predetermined time period, and resets the point-to-multipoint connection when there is at least one paging receiver from which the paging response has not been received for the predetermined time period.

According to a fourth aspect of the present invention, the paging sender sets up the point-to-multipoint connection in the ATM transmission system, and transmits a check cell to the paging receivers through the point-to-multipoint connection at intervals of a first predetermined time period. Each of the paging receivers transmits a paging response to the paging sender when a paging cell is received. The paging sender determines whether there is a paging receiver from which the paging response has not been received for a second predetermined time period, and resets the point-to-multipoint connection when there is at least one paging receiver from which the paging response has not been received for the second predetermined time period.

DETAILED DESCRIPTION OF THE PREFERRED EMBODIMENTS

SYSTEM CONFIGURATION

A mobile communications system is designed to deliver a paging signal from a paging transmitter to a plurality of base stations through ATM point-to-multipoint connection.

Figure 1:
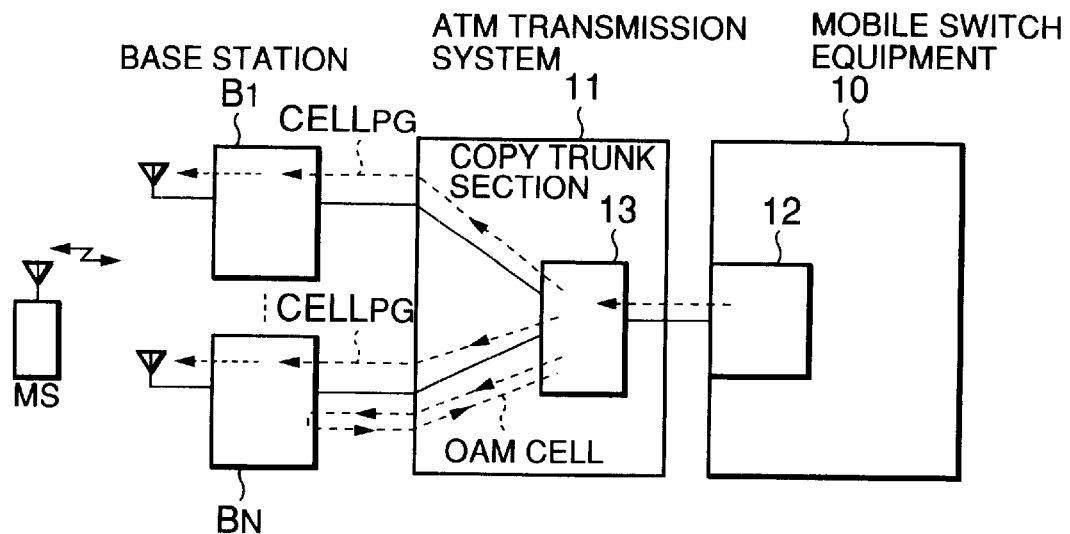
FIG. 1 is a block diagram showing a first example of a paging cell delivery method in a conventional mobile communications system.
Figure 2:
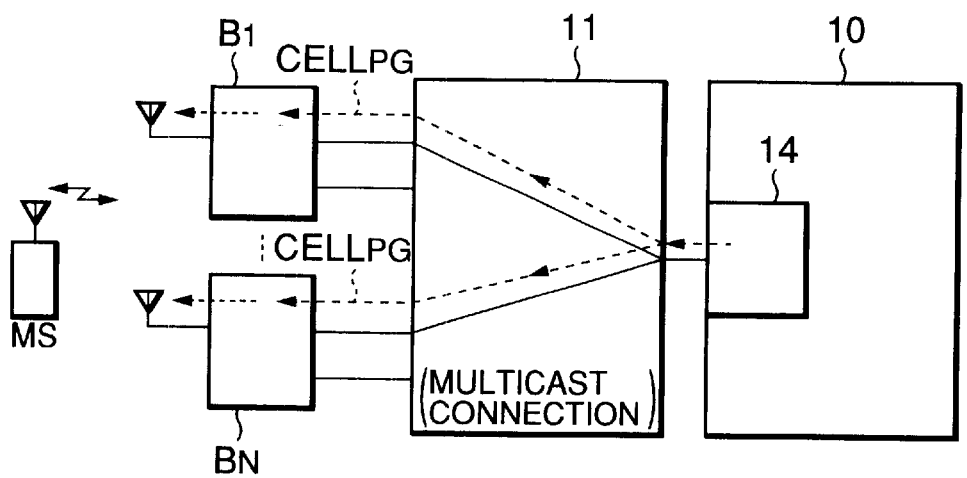
FIG. 2 is a block diagram showing a second example of a paging cell delivery method in a conventional mobile communications system.
Figure 3:
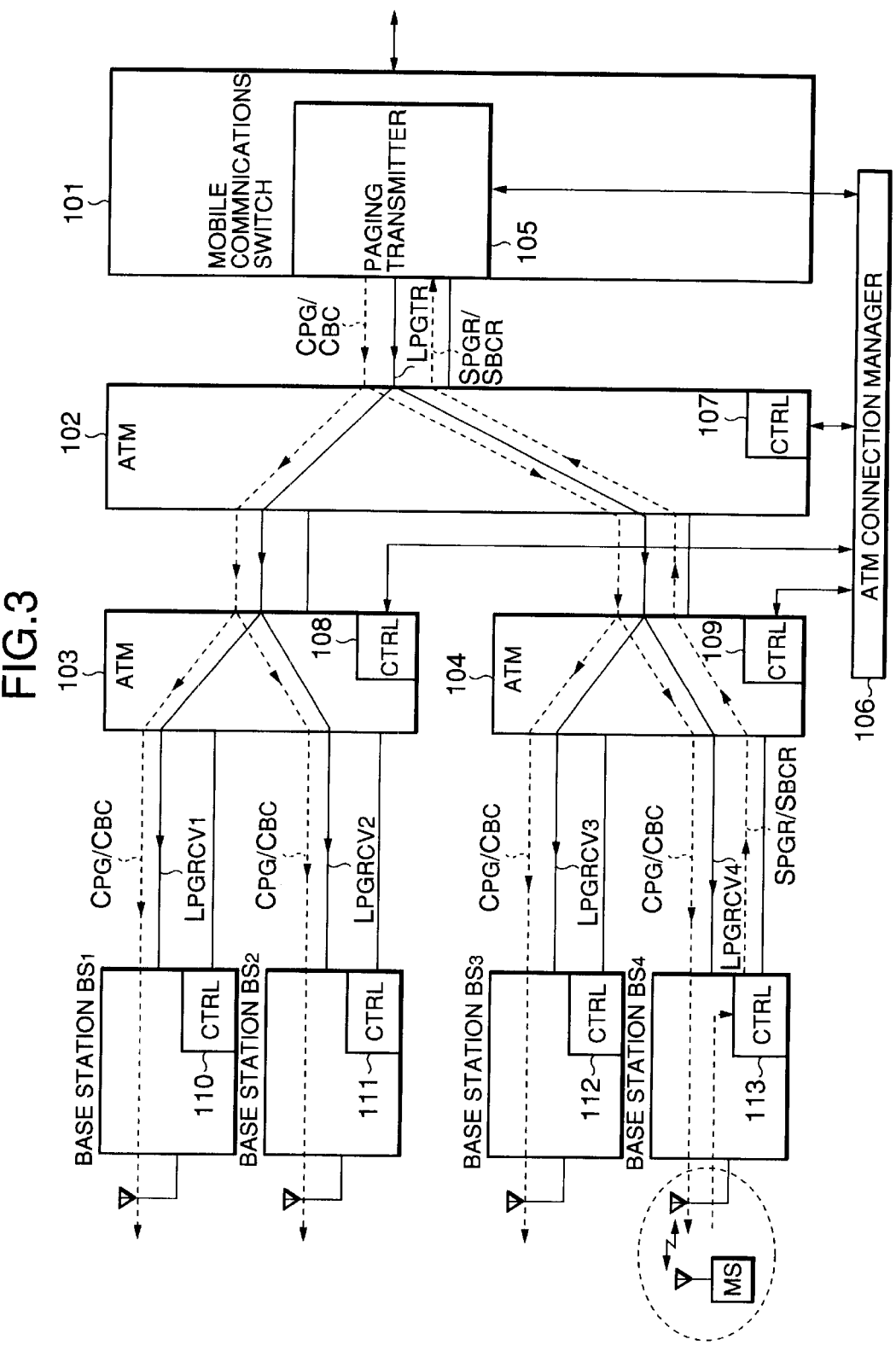
FIG. 3 is a block diagram showing a mobile communications system employing an ATM connection check method according to the present invention.

Referring to FIG. 3, for simplicity, mobile communications switch 101 is connected to four base stations $BS_1$–$BS_4$ through ATN transmission equipment 102–104 where the ATM point-to-multipoint connection has been set up. More specifically, the mobile communications switch 101 is provided with a paging transmitter 105. The paging transmitter 105 includes a paging transmission controller but not shown in FIG. 3. An ATM connection manager 106 manages the paging transmitter 105 and the ATM transmission equipment 102–104. Which have ATM controllers 107–109 therein, respectively. The respective ATM controllers 107–109 control the ATM transmission equipment to set up the ATM point-to-multipoint connection between a paging transmission line $L_{PGTR}$ and four paging receive lines $L_{PGRCV1}$–$L_{PGRCV4}$ under the control of the ATM connection manager 106. The four paging receive lines $L_{PGRCV1}$–$L_{PGRCV4}$ are connected to the four base stations $BS_1$–$BS_4$, respectively. The base stations $BS_1$–$BS_4$ have base station controller 110–113 therein.

When an incoming call occurs, the paging transmitter 105 converts the paging signal to an ATM paging cell $C_{PG}$ and transmits it to the paging transmission line $L_{PGTR}$. When receiving the ATM paging cell $C_{PG}$ from the paging transmitter 105, the ATM transmission equipment 102 delivers the ATM paging cell $C_{PG}$ to both the ATM transmission equipment 103 and 104 through the set point-to-multipoint connection. Similarly, the ATM transmission equipment 103 delivers the received ATM paging cell $C_{PG}$ to both the paging receive lines $L_{PGRCV3}$ and $L_{PGRCV4}$ and the ATM transmission equipment 104 delivers the received ATM paging cell $C_{PG}$ to both the paging receive lines $L_{PGRCV3}$ and $L_{PGRCV4}$ through the set point-to-multipoint connection.

When the respective base stations $BS_1$–$BS_4$ receive the ATM paging cell $C_{PG}$ through the paging receive lines $L_{PGRCV1}$–$L_{PGRCV4}$, the base stations $BS_1$–$BS_4$ each convert the received ATM paging cell $C_{PG}$ to a paging signal having a destination address and transmit it to their own radio zones.

When a mobile terminal MS to which the paging signal is addressed is located within the radio zone of a base station (here, the base station $B_4$). The mobile terminal MS transmits an acknowledgment back to that base station $B_4$.

When receiving the acknowledgment from the mobile terminal MS, the base station controller 113 of the base station $B_4$ converts it to a paging response signal $S_{PGR}$ conforming to predetermined wired communication format and then transmits it to the paging transmitter 105. In this example, the paging response signal $S_{PGR}$ is an ATM cell which is transmitted through point-to-point connection between each base station and the paging transmitter 105.

Hereinafter, first to fourth embodiments of the present invention will be described in detail.

FIRST EMBODIMENT

In the first embodiment, the paging transmitter 105 checks the point-to-multipoint connection by transmitting a point-to-multipoint check cell at regular intervals. Each of the base stations $BS_1$–$BS_4$ determines whether the point-to-multipoint check cell is received at regular intervals to check the ATM point-to-multipoint connection for continuity. Therefore, each of the base stations $BS_1$–$S_4$ is provided with a timer for monitoring the point-to-multipoint connection.

Figure 4:
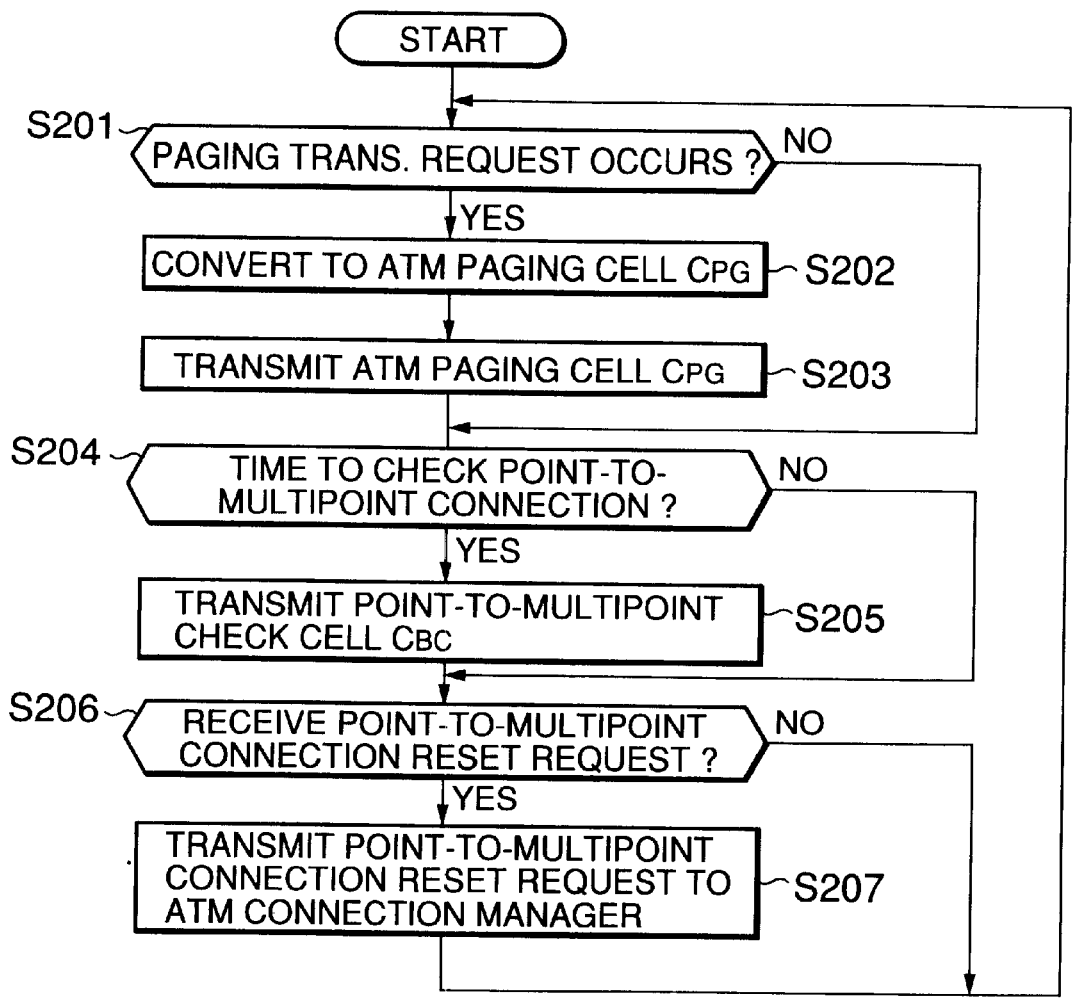
FIG. 4 is a flowchart showing the operation of a transmitting side in a first embodiment of an ATM connection check method according to the present invention.

Referring to FIG. 4, the paging transmission controller of the paging transmitter 105 determines whether a paging transmission request occurs (step S201). When an incoming call to a mobile terminal occurs (YES in step S201), the paging transmission controller converts a paging signal to an ATM paging cell $C_{PG}$ (step S202) and then transmits the ATM paging cell $C_{PG}$ to the paging transmission line $L_{PGTR}$ (step S203).

After the transmission of the ATM paging cell $C_{PG}$ or when no incoming call occurs (NO in step S201), the paging transmission controller determines whether it is a time to check the point-to-multipoint connection (step S204). If the present time instant is a time to check the point-to-multipoint connection (YES in step S204), the paging transmission controller transmits a point-to-multipoint check cell $C_{BC}$ to the paging transmission line $L_{PGTR}$ (step S205). After the transmission of the point-to-multipoint check cell $C_{BC}$ or when it is not the time (NO in step S204), the paging transmission controller waits for a point-to-multipoint connection reset request to be received from any base station (step S206). When receiving the point-to-multipoint connection reset request (YES in step S206), the paging transmission controller requests the ATM connection manager 106 to reset the point-to-multipoint connection (step S207). After the transmission of the point-to-multipoint connection reset request or when the point-to-multipoint connection reset request is not received (NO in step S206), control goes back to the step S201.

Figure 5:
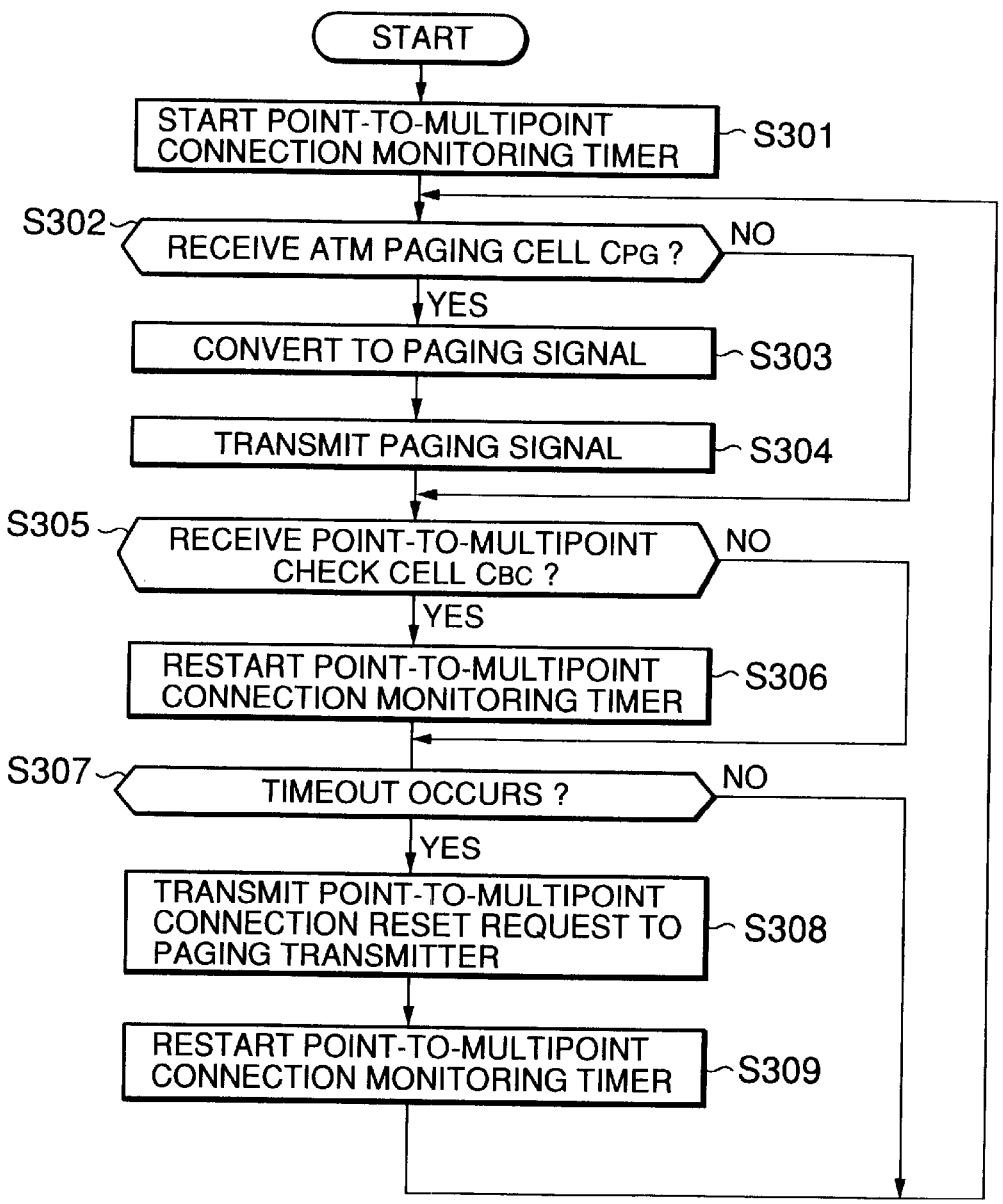
FIG. 5 is a flowchart showing the operation of a receiving side in the first embodiment.

Referring to FIG. 5, the base station controller of each of the base stations $BS_1$–$BS_4$ starts the point-to-multipoint connection monitoring timer operating (step S301). The point-to-multipoint connection monitoring timer has been set for a predetermined monitoring time period that is about twice the transmission interval of the point-to-multipoint check cell $C_{BC}$. Therefore, two point-to-multipoint check cells are received before the point-to-multipoint connection monitoring timer expires.

Subsequently, the base station controller determines whether an ATM paging cell $C_{PG}$ is received (step S302). If such a cell Is received (YES in step S302), the base station controller converts it to a paging signal (step S303) and transmits the paging signal to mobile terminals located within the radio zone thereof (step S304).

After the transmission of the paging signal or when the paging cell $C_{PG}$ is not received (NO in step S302), the base station controller determines whether the point-to-multipoint check cell $C_{BC}$ is received (step S305). If it is received (YES in step S305), then the base station controller restarts the point-to-multipoint connection monitoring timer and waits for subsequent point-to-multipoint check cell $C_{BC}$ (step S306). After the point-to-multipoint connection monitoring timer is restarted or when the point-to-multipoint check cell $C_{BC}$ is not received (NO in step S305), the base station controller checks if the point-to-multipoint connection monitoring timer expires (step S307). When a timeout occurs (YES in step S307), the base station controller transmits the point-to-multipoint connection reset request to the paging transmitter 105 (step S308) and restarts the point-to-multipoint connection monitoring timer (step S309).

After the point-to-multipoint connection monitoring timer is restarted or when the transmission of the point-to-multipoint connection reset request or when the point-to-multipoint connection monitoring timer has not expired (NO in step S307), control goes back to the step S302.

In this manner, when there is developed any problem in the ATM point-to-multipoint connection, a base station affected by the problem fails to receive the point-to-multipoint check cell $C_{BS}$ at the regular intervals. This causes the point-to-multipoint connection reset request to be transmitted to the paging transmitter 105. Therefore, the transmitting side, that is, the paging transmitter 105, is informed of occurrence of any fault in the ATM point-to-multipoint connection and requests the point-to-multipoint connection resetting for the ATM connection manager 106.

SECOND EMBODIMENT

In the second embodiment, each base station checks the point-to-multipoint connection by requesting a point-to-multipoint check cell and then checking whether it is received. Therefore, each of the base stations $BS_1$–$BS_4$ is provided with a timer for monitoring the point-to-multipoint connection and another time for monitoring the reception of the point-to-multipoint check cell.

Figure 6:
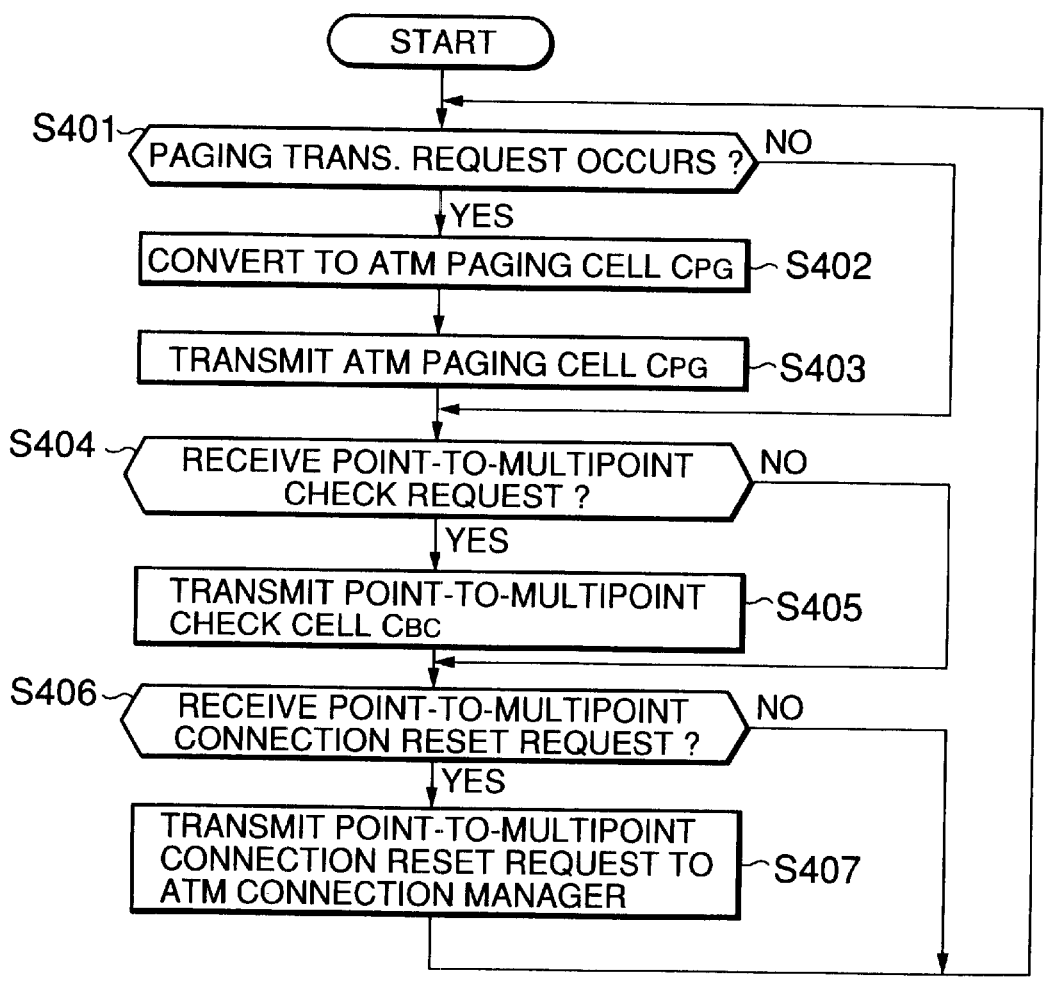
FIG. 6 is a flowchart showing the operation of a transmitting side in a second embodiment of an ATM connection check method according to the present Invention.

Referring to FIG. 6, the paging transmission controller of the paging transmitter 105 determines whether a paging transmission request occurs (step S401). When an incoming call to a mobile terminal occurs (YES in step S401), the paging transmission controller converts a paging signal to an ATM paging cell $C_{PG}$ (step S402) and then transmits the ATM paging cell $C_{PG}$ to the paging transmission line $L_{PGTR}$ (step S403).

After the transmission of the ATM paging cell $C_{PG}$, the paging transmission controller determines whether a point-to-multipoint check request is received from any base station (step S404). If such a point-to-multipoint check request is received (YES in step S404), the paging transmission controller transmits a point-to-multipoint check cell $C_{BC}$ to the paging transmission line $L_{PGTR}$ (step S405). Thereafter, the paging transmission controller waits for a point-to-multipoint connection reset request to be received from any base station (step S406). When receiving the point-to-multipoint connection reset request (YES in step S406), the paging transmission controller requests the ATM connection manager 106 to reset the point-to-multipoint connection (step S407).

Figure 7:
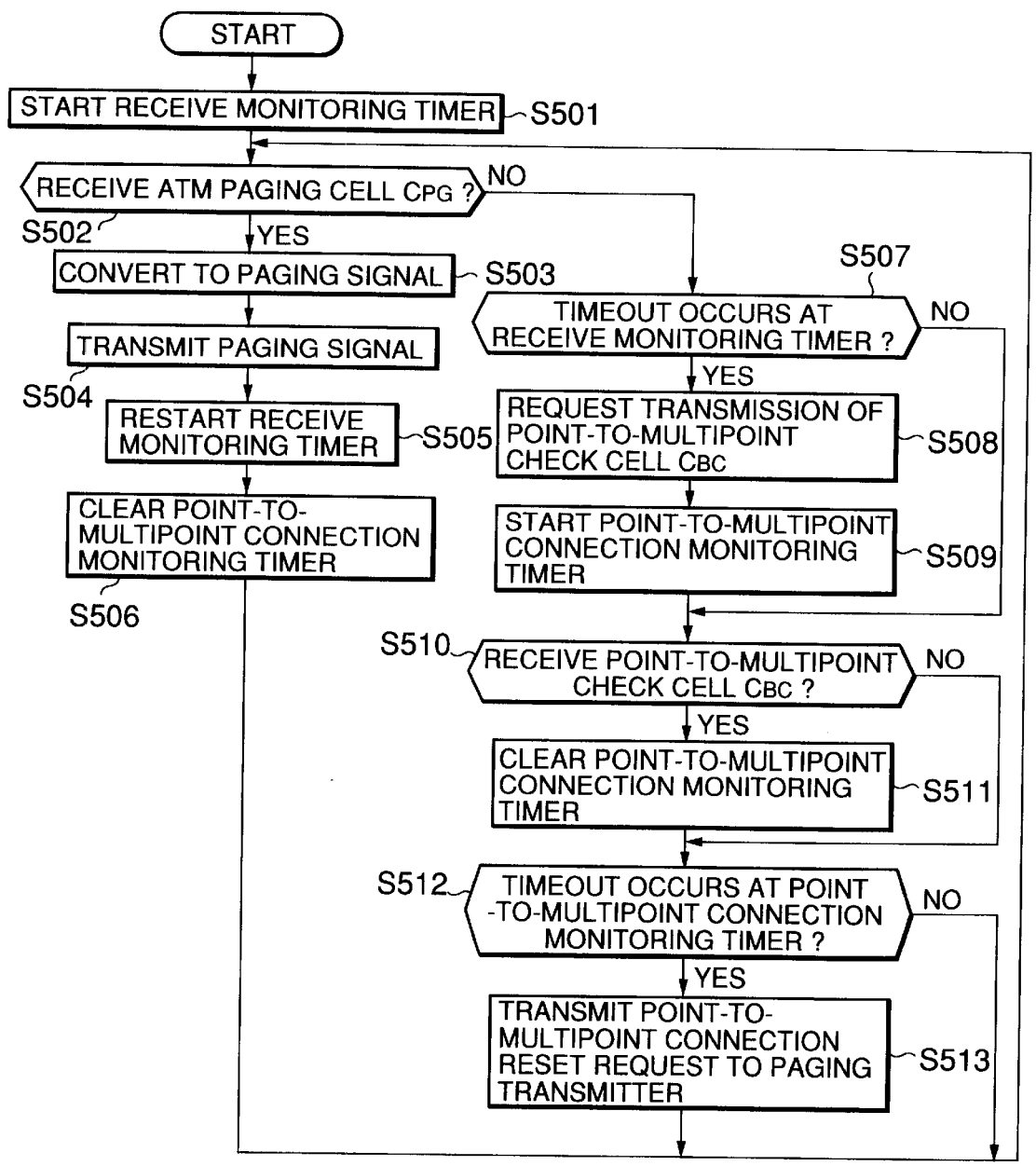
FIG. 7 is a flowchart showing the operation of a receiving side in the second embodiment.

Referring to FIG. 7, the base station controller of each of the base stations $BS_1$–$BS_4$ starts the receive monitoring timer operating (step S501). It is preferable that the receive monitoring timer is set for one of a plurality of monitoring time periods depending on the condition of a base station and a time of day to achieve more precise monitoring. The reason is that the number of paging times may vary from base station to base station and further depending on a time of day.

Subsequently, the base station controller determines whether an ATM paging cell $C_{PG}$ is received (step S502). If such a cell is received (YES in step S502), the base station controller Converts it to a paging signal (step S503) and transmits the paging signal to mobile terminals located within the radio zone thereof (step S504). Further, the base station controller restarts the receive monitoring timer (step S505) and clears the point-to-multipoint connection monitoring timer (step S506). Thereafter, control goes back to the step S502.

On the other hand, if the ATM paging cell $C_{PG}$ has not been received (NO in step S502), then the base station controller checks if the receive monitoring, timer expires (step S507). When a timeout occurs (YES in step S507), there is a possibility that an ATM line is disconnected. Therefore, the base station controller requests transmission of the point-to-multipoint check cell $C_{BC}$ by transmitting the point-to-multipoint check request to the paging transmitter 105 (step S508) and starts the point-to-multipoint connection monitoring timer (step 8509).

After the point-to-multipoint connection monitoring timer is started or when the receive monitoring timer does not expire (NO in step S507), the base station controller determines whether the point-to-multipoint check cell $C_{BC}$ is received (step S510). If it is received (YES in step S510), then the base station controller clears the point-to-multipoint connection monitoring timer (step S511). After the point-to-multipoint connection monitoring timer is cleared or when the point-to-multipoint check cell has not been received (NO in step S510), the base station controller checks if the point-to-multipoint connection monitoring timer expires (step S512). When a timeout occurs (YES in step S512), the base station controller transmits the point-to-multipoint connection reset request to the paging transmitter 105 (step S513).

After the step 506 or 513 or when the point-to-multipoint connection monitoring timer does not expire (NO in step S512), control goes back to the step S502.

In this manner, a paging receiving side, that is, each base station determines whether an ATM paging cell Is received and, if it is not received, checks the point-to-multipoint connection by requesting a point-to-multipoint check cell and then checking whether it is received. In the case where there is developed any problem in the ATM point-to-multipoint connection, a base station affected by the problem fails to receive the point-to-multipoint check cell $C_{BC}$ within the predetermined time period. This causes the point-to-multipoint connection reset request to be transmitted to the paging transmitter 105. Therefore, the transmitting side, that is, the paging transmitter 105, is informed of occurrence of any fault in the ATM point-to-multipoint connection and requests the point-to-multipoint connection resetting for the ATM connection manager 106.

THIRD EMBODIMENT

In the third embodiment, the paging transmitter 105 checks the point-to-multipoint connection for continuity by determining whether a paging response is received for each base station within a predetermined time period. Therefore, the paging transmitter 105 is provided with a receive monitoring timer for each of the base stations $BS_1$–$BS_4$. As described before, it is preferable that each receive monitoring timer is set for one of a plurality of monitoring time periods depending on a time of day to achieve more precise monitoring.

Figure 8:
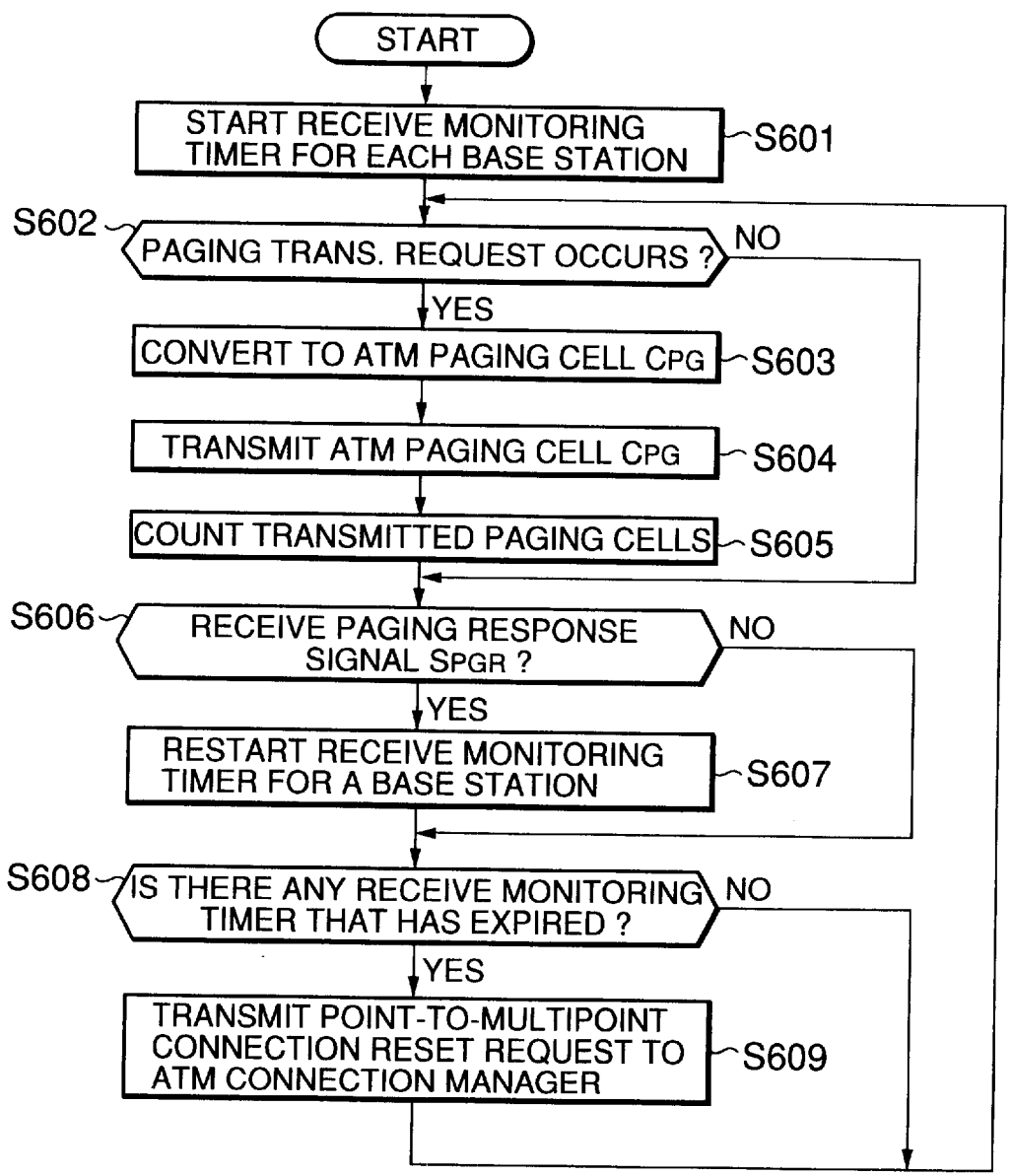
FIG. 8 is a flowchart showing the operation of a transmitting side in a third embodiment of an ATM connection check method according to the present invention.

Referring to FIG. 8, the paging transmission controller of the paging transmitter 105 starts the receive monitoring timer for each of the base stations $BS_1$–$BS_4$ (step S601). Thereafter, the paging transmitter 105 determines whether a paging transmission request occurs (step S602). When an incoming call to a mobile terminal occurs (YES in step S602), the paging transmission controller converts a paging signal to an ATM paging cell $C_{PG}$ (step S603) and then transmits the ATM paging cell $C_{PG}$ to the paging transmission line $L_{PGTR}$ (step S604) and then counts the number of transmitted paging cells for each base station (step S605).

After the transmission of the ATM paging cell $C_{PG}$ or when no incoming call occurs (NO in step S602), the paging transmission controller determines whether a paging response signal $S_{PGR}$ is received from a base station (step S606). If the paging response signal $S_{PGR}$ is received from a certain base station (YES in step S606), the paging transmission controller restarts the receive monitoring timer for that base station (step S607).

After the receive monitoring timer for that base station is restarted or when no paging response signal is received (NO in step S606), the paging transmission controller determines whether there is a receive monitoring timer that has expired (step S608). When such an expired receive monitoring timer exists (YES in step S608), the paging transmission controller requests the ATM connection manager 106 to reset the point-to-multipoint connection (step S609). After the transmission of the point-to-multipoint connection reset request or when no receive monitoring timer expires (NO in step S608), control goes back to the step S602.

In this manner, the paging transmitter 105 determines whether a paging response is received for each base station within a predetermined time period to check the point-to-multipoint connection for continuity. If there is a base station from which the paging response is not received, then it is determined that any fault in the ATM point-to-multipoint connection occurs and then the paging transmitter requests the point-to-multipoint connection resetting for the ATM connection manager 106.

FOURTH EMBODIMENT

In the fourth embodiment, the paging transmitter 105 checks the point-to-multipoint connection by transmitting a point-to-multipoint check cell at regular intervals and then monitoring a response to the point-to-multipoint check cell. Therefore, the paging transmitter 105 is provided with a receive monitoring timer for each of the base stations $BS_1$–$BS_4$. As described before, it is preferable that each receive monitoring timer is set for one of a plurality of monitoring time periods depending on a time of day to achieve more precise monitoring.

Figure 9:
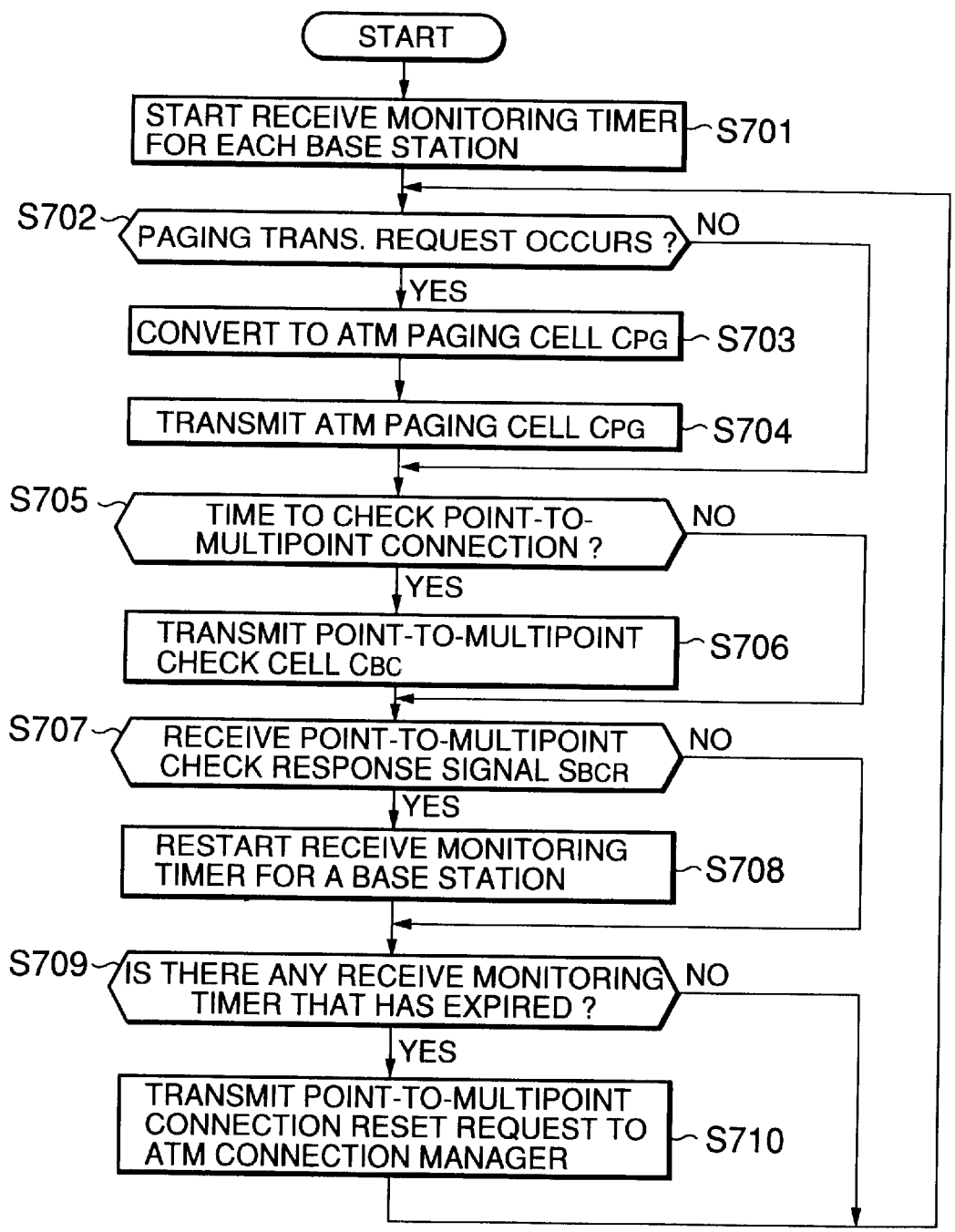
FIG. 9 is a flowchart showing the operation of a transmitting side in a fourth embodiment of an ATM connection check method according to the present invention.

Referring to FIG. 9, the paging transmission controller of the paging transmitter 105 starts the receive monitoring timer for each of the base stations $BS_1$–$BS_4$ (step S701). Thereafter, the paging transmitter 105 determines whether a paging transmission request occurs (step S702). When an incoming call to a mobile terminal occurs (YES in step S702), the paging transmission controller converts a paging signal to an ATM paging cell $C_{PG}$ (step S703) and then transmits the ATM paging cell $C_{PG}$ to the paging transmission line Arts (step S704).

After the transmission of the ATM paging cell $C_{PG}$ or when no incoming call occurs (NO in step S702), the paging transmission controller determines whether it is a time to check the point-to-multipoint connection (step S705). If the present time instant is a time to check the point-to-multipoint connection (YES in step 5705), the paging transmission controller transmits a point-to-multipoint check cell $C_{BC}$ to the paging transmission line $L_{PGTR}$ (step S706).

After the transmission of the point-to-multipoint check cell $C_{BC}$ or when it is not the time (NO in step S705), the paging transmission controller determines whether a paging response signal $S_{PGR}$ is received from a base station (step S707). If the paging response signal $S_{PGR}$ is received from a certain base station (YES in step S707), the paging transmission controller restarts the receive monitoring timer for that base station (step S708).

After the receive monitoring timer for that base station is restarted or when no paging response signal is received (NO in step S708), the paging transmission controller determines whether there is a receive monitoring timer that has expired (step S709). When such an expired receive monitoring timer exists (YES in step S709), the paging transmission controller requests the ATM connection manager 106 to reset the point-to-multipoint connection (step S710). After the transmission of the point-to-multipoint connection reset request or when no receive monitoring timer expires (NO In step S709), control goes back to the step S702.

Figure 10:
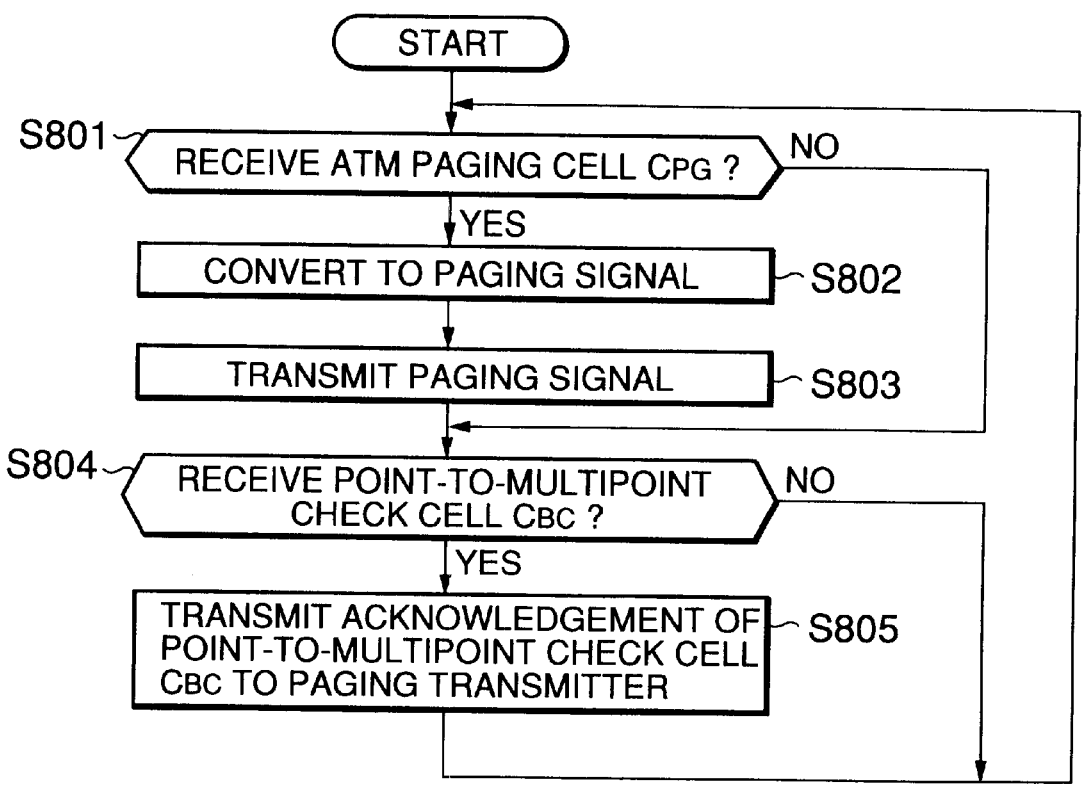
FIG. 10 is a flowchart showing the operation of a receiving side in the fourth embodiment.

Referring to FIG. 10, the base station controller of each of the base stations $BS_1$–$BS_4$ determines whether an ATM paging cell $C_{PG}$ is received (step S801). If such a cell is received (YES in step S801), the base station controller converts it to a paging signal (step S802) and transmits the paging signal to mobile terminals located within the radio zone thereof (step S803).

After the transmission of the paging signal or when the paging cell $C_{PG}$ is not received (NO in step S801), the base station controller determines whether the point-tomultipoint check cell $C_{BC}$ is received (step S804). If it is received (YES in step S804), then the base station controller transmits an acknowledgment of the point-to-multipoint check cell $C_{BC}$ to the paging transmitter 105 (step S805).

In this manner, when there is developed any problem in the ATM point-to-multipoint connection, a base station affected by the problem fails to transmit a response to the point-to-multipoint check cell $C_{BC}$ at the regular intervals. Therefore, by monitoring the response received from a base station, the transmitting side, that is, the paging transmitter 105, can determine whether any fault occurs in the ATM point-to-multipoint connection. When such a fault occurs, the paging transmitter 105 requests the point-to-multipoint connection resetting for the ATM connection manager 106.

ANOTHER SYSTEM CONFIGURATION

Figure 11:
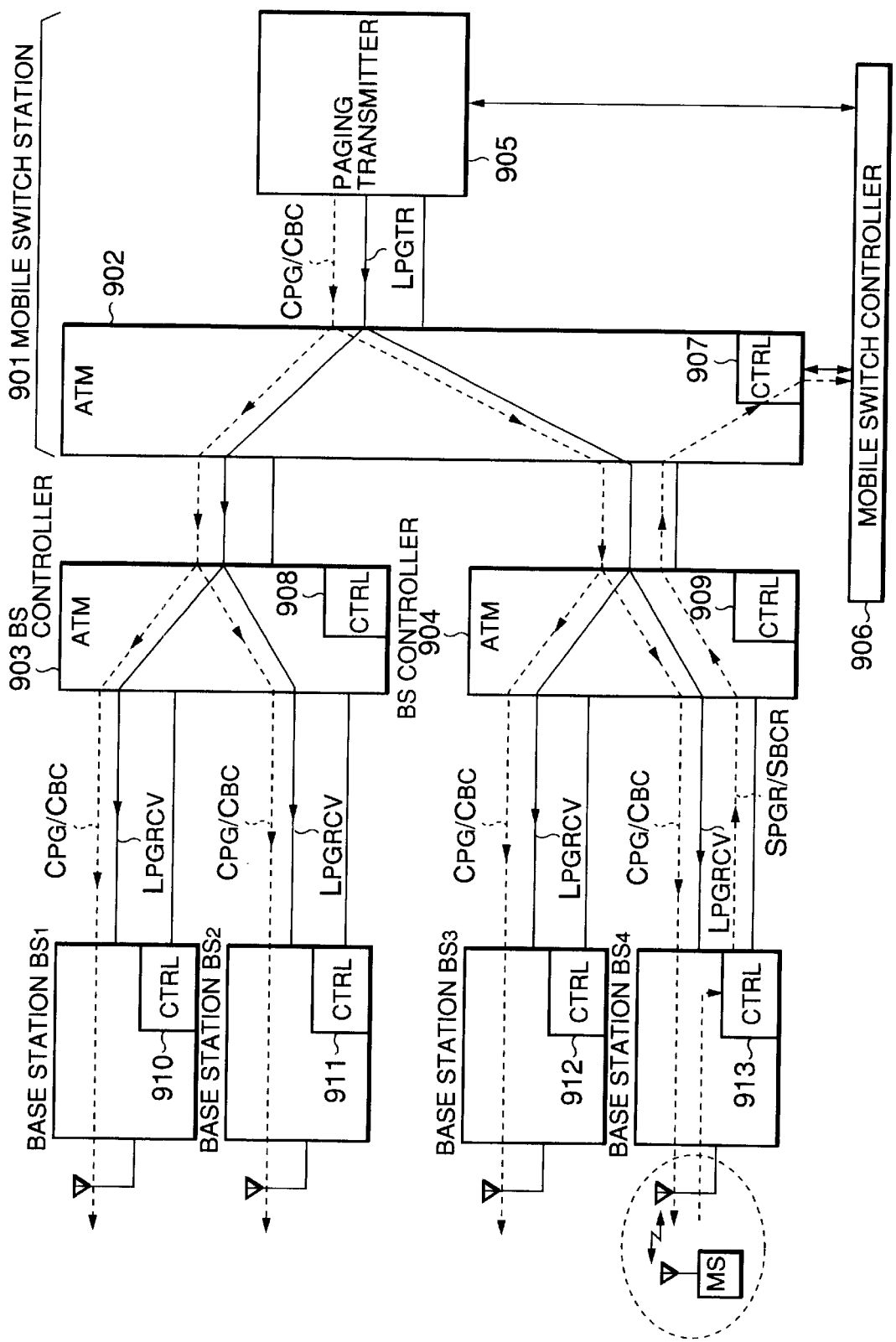
FIG. 11 is a block diagram showing another mobile communications system employing an ATM connection check method according to the present invention.

Referring to FIG. 11, a mobile switch station 901 is connected to four base stations $BS_1$–$BS_4$ through the ATM point-to-multipoint connection as described before. More specifically, the mobile switch station 901 includes an ATM section 902, a paging transmitter 905, and a mobile switch controller 906. The mobile switch controller 906 controls the paging transmitter 905 and the ATM section 902. The ATM section 902 includes a controller 907 and corresponds to the ATM transmission equipment 102 as shown in FIG. 3.

The base stations $BS_1$ and $BS_2$ are controlled by a base station controller 903 and the base stations $BS_3$ and, $BS_4$ are controlled by a base station controller 904. Further, the respective base station controllers 903 and 904 include controllers 908 and 909 and further ATM sections corresponding to the ATM transmission equipment 103 and 104 as shown in FIG. 3. The base stations $BS_1$–$BS_4$ are provided with controllers 910–913, respectively.

The ATM point-to-multipoint connection between a paging transmission line $L_{PGTR}$ and four paging receive lines $L_{PGRCV1}$–$L_{PGRCV4}$ is set up in an ATM transmission section composed of the ATM section 902 and the ATM sections of the base station controller 903 and 904. The four paging receive lines $L_{PGRCV1}$–$L_{PGRCV4}$ are connected to the four base stations $BS_1$–$BS_4$, respectively.

When an incoming call occurs, the paging transmitter 905 converts the paging signal to an ATM paging cell $C_{PG}$ and transmits it to the paging transmission line $L_{PGTR}$. When receiving the ATM paging cell $C_{PG}$ from the paging transmitter 105, the ATM section 902 delivers the ATM paging cell $C_{PG}$ to both the ATM sections of the base station controllers 903 and 904 through the set point-to-multipoint connection. Similarly, the ATM section of the base station controller 903 delivers the received ATM paging cell $C_{PG}$ to both the paging receive lines $L_{PGRCV1}$ and $L_{PGRCV2}$ and the ATM section of the base station controller 904 delivers the received ATM paging Cell $C_{PG}$ to both the paging receive lines $L_{PGRCV3}$ and $L_{PGRCV4}$ through the set point-to-multipoint connection.

When the respective base stations $BS_1$–$BS_4$ receive the ATM paging cell $C_{PG}$ through the paging receive lines $L_{PGRCV1}$–$L_{PGRCV4}$, the base stations $BS_1$–$BS_4$ each convert the received ATM paging cell $C_{PG}$ to a paging signal having a destination address and transmit it to their own radio zones.

When a mobile terminal MS to which the paging signal is addressed Is located within the radio zone of a base station (here, the base station $B_4$), the mobile terminal MS transmits an acknowledgment back to that base station $B_4$.

When receiving the acknowledgment from the mobile terminal MS, the controller of the base station $B_4$ converts it to a paging response signal $S_{PGR}$ conforming to predetermined wired communication format and then transmits it to the mobile switch controller 906 of the mobile switch station 901. In this example, the paging response signal $S_{PGR}$ is an ATM cell, which is transmitted through point-to-point connection between each base station and the ATM section 902.

The above first to fourth embodiments of the present invention can be applied to the systems as shown in FIG. 11. More specifically, the mobile switch controller 906 controls the paging transmitter 905 according to the control flows as shown in FIGS. 4, 6, 8, and 9. The base stations operate according to the control flows as shown In FIGS. 5, 7, and 10.

What is claimed is:

1. A method for checking a point-to-multipoint connection set up in an asynchronous transfer mode (ATM) transmission system between a paging sender and a plurality of paging receivers in a mobile communications system, comprising the steps of:
   at the paging sender,
      setting up the point-to-multipoint connection in the ATM transmission system:
      transmitting a check cell to the paging receivers through the point-to-multipoint connection at intervals of a first predetermined time period;
   at each of the paging receivers,
      determining whether the check cell is received within a second predetermined time period longer than the first predetermined time period; and
      transmitting a connection resetting request to the paging sender to reset the point-to-multipoint connection when the check cell has not been received for the second predetermined time period.

2. The method according to claim 1, wherein the paging receivers is each included in base stations of the mobile communications system and the paging sender is included in a mobile switch station.

3. A method for checking a point-to-multipoint connection set up in an asynchronous transfer mode (ATM) transmission system between a paging sender and a plurality of paging receivers in a mobile communications system, comprising the steps of:
   at the paging sender,
      setting up the point-to-multipoint connection in the ATM transmission system;
      transmitting a paging cell to the paging receivers through the point-to-multipoint connection when an incoming call occurs;
   at each of the paging receivers,
      determining whether a paging cell is received within a first predetermined time period;
      transmitting a check request to the paging sender when a paging cell has not been received for the first predetermined time period;
   at the paging sender,
      transmitting a check cell to the paging receivers through the point-to-multipoint connection in response to the check request received from at least one of the paging receivers;
   at the paging receiver,
      determining whether the check cell is received within a second predetermined time period after the check request has been transmitted: and
      transmitting a connection resetting request to the paging sender to reset the point-to-multipoint connection when the check cell has not been received for the second predetermined time period.

4. The method according to claim 3, wherein the paging receivers is each included in base stations of the mobile communications system and the paging sender is included in a mobile switch station.

5. The method according to claim 3, wherein the first predetermined time period is determined depending on the number of paging occurrences.

6. A method for checking a point-to-multipoint connection set up in an asynchronous transfer mode (ATM) transmission system between a paging sender and a plurality of paging receivers in a mobile communications system, comprising the steps of:

at the paging sender,
setting up the point-to-multipoint connection in the ATM transmission system;
transmitting a paging cell to the paging receivers through the point-to-multipoint connection when an incoming call occurs;

at each of the paging receivers.
transmitting a paging response to the paging sender when a paging cell is received;

at the paging sender,
determining whether there is a paging receiver from which the paging response has not been received for a predetermined time period; and
resetting the point-to-multipoint connection when there is at least one paging receiver from which the paging response has not been received for the predetermined time period.

7. The method according to claim 6, wherein the paging receivers is each included in base stations of the mobile communications system and the paging sender is included in a mobile switch station.

8. The method according to claim 6, wherein the predetermined time period varies from paging receiver to paging receiver depending on the number of paging occurrences.

9. A method for checking a point-to-multipoint connection set up in an asynchronous transfer mode (ATM) transmission system between a paging sender and a plurality of paging receivers in a mobile communications system, comprising the steps of:

at the paging sender,
setting up the point-to-multipoint connection in the ATM transmission system;
transmitting a check cell to the paging receivers through the point-to-multipoint connection at intervals of a first predetermined time period:

at each of the paging receivers,
transmitting a paging response to the paging sender when a paging cell is received;

at the paging sender,
determining whether there is a paging receiver from which the paging response has not been received for a second predetermined time period; and
resetting the point-to-multipoint connection when there is at least one paging receiver from which the paging response has not been received for the second predetermined time period.

10. The method according to claim 9, wherein the paging receivers is each included in base stations of the mobile communications system and the paging sender is included in a mobile switch station.

11. The method according to claim 9, wherein the second predetermined time period varies from paging receiver to paging receiver depending on the number of paging occurrences.

* * * * *

UNITED STATES PATENT AND TRADEMARK OFFICE
CERTIFICATE OF CORRECTION

PATENT NO. : 6,381,217 B1  Page 1 of 1
DATED : April 30, 2002
INVENTOR(S) : Shoji Tanaka It is certified that error appears in the above-identified patent and that said Letters Patent is hereby corrected as shown below:

Column 2,
Line 37, delete "Is" insert -- is --

Column 3,
Line 37, delete "Invention" insert -- invention --;
Line 63, delete "ATN" insert -- ATM --

Column 4,
Line 3, delete "104. Which" insert -- 104, which --;
Line 22, delete "$L_{PGRCV3}$ and $L_{PGRCV4}$" insert -- $L_{PGRCV1}$ and $L_{PGRCV2}$ --

Column 5,
Line 28, delete "Is" insert -- is --;
Line 57, delete "$C_{BS}$" insert -- $C_{BC}$ --

Column 6,
Line 40, delete "Converts" insert -- converts --;
Line 57, delete "8509" insert -- S509 --

Column 7,
Line 10, delete "Is" insert -- is --

Column 9,
Line 63, delete "Is" insert -- is --

Signed and Sealed this

Third Day of December, 2002

JAMES E. ROGAN
*Director of the United States Patent and Trademark Office*